US011850977B2

(12) United States Patent
Yu et al.

(10) Patent No.: US 11,850,977 B2
(45) Date of Patent: Dec. 26, 2023

(54) DEVICE FOR FOLDING SEAT

(71) Applicants: Hyundai Motor Company, Seoul (KR); Kia Corporation, Seoul (KR); DAYOU A-TECH CO., LTD., Gwangju (KR); DAEWON Precision Industrial Co., LTD, Ansan-si (KR); Hyundai Transys Inc., Seosan-si (KR)

(72) Inventors: Sang Uk Yu, Seoul (KR); Seok Hwan Kim, Suwon-si (KR); Seon Hyeok Lee, Gyeonggi-do (KR); Sung Young Bok, Hwaseong-si (KR); Seon Chae Na, Yongin-si (KR); Hae Won Lee, Ansan-si (KR); Ui Bo Shim, Hwaseong-si (KR); Dae Keon Jang, Seongnam-si (KR); Ji Sung Bae, Pyeongtaek-si (KR)

(73) Assignees: HYUNDAI MOTOR COMPANY, Seoul (KR); KIA CORPORATION, Seoul (KR); DAYOU A-TECH CO., LTD., Gwangju (KR); DAEWON PRECISION INDUSTRIAL CO., LTD, Ansan-si (KR); HYUNDAI TRANSYS INC., Seosan-si (KR)

(*) Notice: Subject to any disclaimer, the term of this patent is extended or adjusted under 35 U.S.C. 154(b) by 0 days.

(21) Appl. No.: 17/872,591

(22) Filed: Jul. 25, 2022

(65) Prior Publication Data

US 2023/0056083 A1 Feb. 23, 2023

(30) Foreign Application Priority Data

Aug. 17, 2021 (KR) .................. 10-2021-0108258

(51) Int. Cl.
*B60N 2/30* (2006.01)
*B60N 2/22* (2006.01)

(52) U.S. Cl.
CPC ............. *B60N 2/3004* (2013.01); *B60N 2/22* (2013.01)

(58) Field of Classification Search
CPC ... B60N 2/3004; B60N 2/3009; B60N 2/3011
See application file for complete search history.

(56) References Cited

U.S. PATENT DOCUMENTS

| | | | |
|---|---|---|---|
| 7,134,724 B2 * | 11/2006 | Chabanne | B60N 2/2352 297/378.12 |
| 2007/0138854 A1 * | 6/2007 | Paing | B60N 2/20 297/378.12 |
| 2014/0327285 A1 * | 11/2014 | Brines | A47C 1/024 297/354.1 |

FOREIGN PATENT DOCUMENTS

| | | | | |
|---|---|---|---|---|
| CA | 2438023 A1 * | 2/2004 | ............... | B60N 2/12 |
| DE | 10 2014 202 683 A1 | 11/2014 | | |

(Continued)

OTHER PUBLICATIONS

Extended European Search Report dated Jan. 27, 2023, issued in corresponding European Patent Application No. 22187173.4.

*Primary Examiner* — Timothy J Brindley
(74) *Attorney, Agent, or Firm* — Morgan, Lewis & Bockius LLP (57) ABSTRACT

A device for folding a seat may include: a lower arm stopper fixed to a predetermined radial position with respect to a reclining hinge shaft of a seatback as a center; a lock plate configured to rotate about a rotation shaft as a center while being hooked to the lower arm stopper in a process of reclining forward together with the seatback with respect to the reclining hinge shaft as the center; and a folding link limited to rotate by being hooked to the lock plate and configured to make folding rotation together with the seatback with respect to a folding hinge shaft, as a center, located at a part above the reclining hinge shaft, by being (Continued)

released from being hooked to the lock plate according to the rotation of the lock plate.

9 Claims, 6 Drawing Sheets

(56) References Cited

FOREIGN PATENT DOCUMENTS

| EP | 1935709 A2 * | 6/2008 | ........... B60N 2/0232 |
|----|---|---|---|
| KR | 101242666 B1 * | 2/2013 | |
| KR | 10-2018-0060396 A | 6/2018 | |

* cited by examiner

DEVICE FOR FOLDING SEAT

CROSS REFERENCE TO RELATED APPLICATION

The present application claims the benefit of priority to Korean Patent Application No. 10-2021-0108258, filed on Aug. 17, 2021 in the Korean Intellectual Property Office, the entire contents of which is incorporated herein for all purposes by reference.

TECHNICAL FIELD

The present disclosure relates to a device for folding a seat, the device improving convenience of a folding operation by implementing the folding operation without maintaining a lever manipulation until the end of the folding operation when the folding manipulation of the seatback is performed.

BACKGROUND

Figure 1:
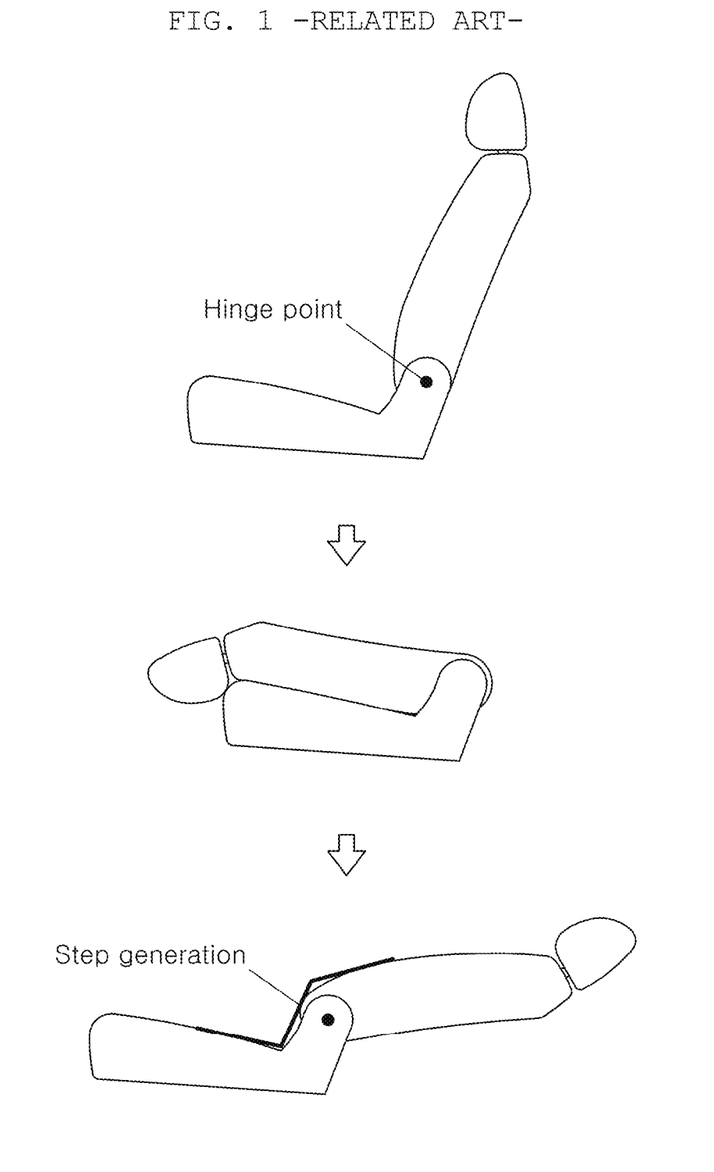
FIG. 1 is a view illustrating a seatback behavior of folding a seat having a conventional one-stage hinge structure.

When a single-stage hinge structure for a folding seat of a front seat as shown in FIG. 1 is used, a hinge point position is high, so there is a problem in that a step in a waist area of the seat during reclining becomes large, causing back pain to a driver.

Accordingly, the folding seat of the front seat implements a folding operation using a two-stage hinge structure unlike a folding seat of a rear seat, thereby keeping a hinge point low. In such a way, a folding function of the seat is realized while realizing a comfortable posture for a driver by minimizing the step, in a waist area, that occurs during reclining.

However, the conventional two-stage hinge structure is advantageous in terms of sitting posture, but there is an inconvenience in that the folding operation is performed only when the folding lever is maintained in a manipulated state when folding is implemented.

Therefore, when the folding lever is not being pulled continuously, there is a problem in determining such a case as a malfunction as if folding is not being performed. In addition, there is a problem occurring such that elements implementing folding mechanism collide with a hand holding the folding lever during the folding operation, resulting in transferring shock to or injuring a user.

The matters described as the related art above are only for improving understanding of a background of the present disclosure and should not be accepted as acknowledging to correspond to the related art known to those of ordinary skill in the art.

SUMMARY

Accordingly, the present disclosure has been made keeping in mind the above problems occurring in the related art, and the present disclosure is intended to provide a device for folding a seat, the device improving a convenience of a folding operation by implementing the folding operation without maintaining a lever manipulation until the end of the folding operation when the folding manipulation of the seatback is performed.

In order to achieve the above objective, according to one aspect of the present disclosure, there may be provided a device for folding a seat, the device including: a lower arm stopper fixed to a predetermined radial position with respect to a reclining hinge shaft of a seatback as a center; a lock plate configured to rotate about a rotation shaft as a center while being hooked to the lower arm stopper in a process of reclining forward together with the seatback with respect to the reclining hinge shaft as the center; and a folding link limited to rotate by being hooked to the lock plate and configured to make folding rotation together with the seatback with respect to a folding hinge shaft, as a center, located at a part above the reclining hinge shaft, by being released from being hooked to the lock plate according to the rotation of the lock plate.

The reclining hinge shaft and the folding hinge shaft may be coupled to opposite ends of a folding bracket, respectively; the folding bracket may make rotation relative to the lower arm stopper with respect to the reclining hinge shaft as the center; the folding link may make rotation relative to the folding bracket with respect to the folding hinge shaft as the center; and the rotation shaft of the lock plate may be coupled to the folding bracket.

With the rotation shaft of the lock plate as a center, one end and an opposite end of the lock plate may extend toward the lower arm stopper and the folding link, respectively; and as the one end of the lock plate rotates while being hooked to the lower arm stopper, the opposite end of the lock plate may be released from being hooked to the folding link.

The one end of the lock plate may be provided with a stopper locking part; and the lower arm stopper may be disposed on a rotation path of the stopper locking part so that the stopper locking part may be pushed by the lower arm stopper to rotate the lock plate.

An end of the folding link may be provided with a locking groove part; the opposite end of the lock plate may be provided with a link locking part; and in a state in which the link locking part is hooked to the locking groove part, the link locking part may be released from being hooked to the locking groove part according to the rotation of the lock plate.

The device may further include a plate spring configured to provide an elastic restoring force in a rotational direction to which the lock plate is hooked to the folding link.

The device may further include a lever configured to manipulate a reclining or folding operation of the seatback, wherein according to a manipulation of the lever, locking between the seatback and the seat cushion may be released so that the lock plate and the folding link together with the seatback may rotate forward about the reclining hinge shaft as the center.

With the reclining hinge shaft as the center, a guide pin may be fixed at a predetermined radial position; and a guide hole of a long hole into which the guide pin is inserted may extend along a rotation path of the lever in the lever, thereby allowing the lever to rotate in a guide hole section.

The device may further include a lever spring configured to provide an elastic restoring force in a rotational direction opposite to an operation direction of the lever.

The lock plate may rotate with the reclining hinge shaft as the center according to an operation of the lever; and by the lock plate, the folding link may be released from being hooked so that the folding link rotates with the folding hinge shaft as the center, whereby the folding operation may be performed.

The device may further include a folding spring configured to provide an elastic restoring force in a folding direction of the seatback.

As described above, there is an effect that the present disclosure, as described above, not only implements a folding operation of the seatback with one lever manipulation, but also improves convenience of the folding operation because there is no need to hold a lever until the folding operation is completed.

Moreover, there is also an effect that it is not necessary to hold the lever until folding is completed, so an impact is prevented from being applied to a hand holding the lever, thereby preventing the risk of injury to a user during the folding operation of the seatback.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Specific structural or functional descriptions presented in the embodiments of the present disclosure are only exemplified for the purpose of describing embodiments according to the concept of the present disclosure, and the embodiments according to the concept of the present disclosure may be implemented in various forms. In addition, it should not be construed such that the present disclosure is limited to the embodiments described herein, and should be understood to include all modifications, equivalents, and substitutes included in the spirit and scope of the present disclosure.

Meanwhile, in the present disclosure, terms such as first, second, and the like may be used to describe various components, but the components are not limited to the above terms. The above terms are used only for the purpose of distinguishing one component from other components, for example, within the scope not departing from the scope of the rights according to the concept of the present disclosure, the first component may be named as the second component. Similarly, the second component may also be referred to as the first component.

When a component is referred to as being "connected" or "coupled" to another component, it should be understood that the component may be directly connected or coupled to another component, but other components may exist therebetween.

On the other hand, when a component is referred to as being "directly connected" or "directly coupled" to another component, it should be understood that no other element is present therebetween.

Other expressions for describing the relationship between components, that is, expressions such as "between" and "immediately between", "adjacent to" and "directly adjacent to", or the like should be interpreted similarly.

Throughout the specification, the same reference numerals will refer to the same or like parts. On the other hand, the terms used herein are for the purpose of describing the embodiments and are not intended to limit the present disclosure. In the present specification, the singular form also includes the plural form unless specifically stated in the phrase.

As used herein, "comprises" and/or "comprising" means that a referenced component, step, operation, and/or element do not exclude the presence or addition of at least one of other components, steps, operations, and/or elements.

Hereinafter, the present disclosure will be described in detail with reference to the accompanying drawings.

Figure 2:
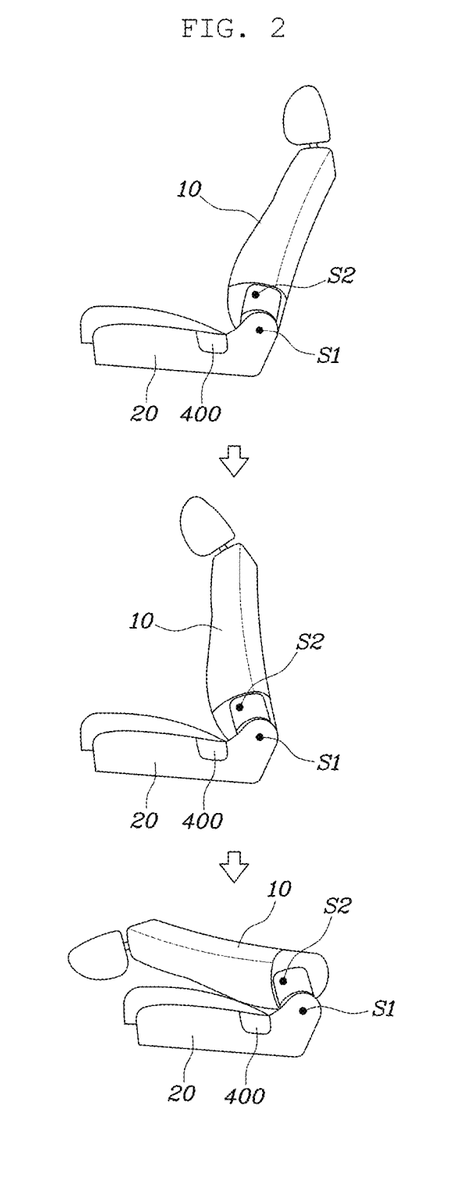
FIG. 2 is a view showing a folding behavior of folding a seat according to one exemplary embodiment of the present disclosure.
Figure 3:
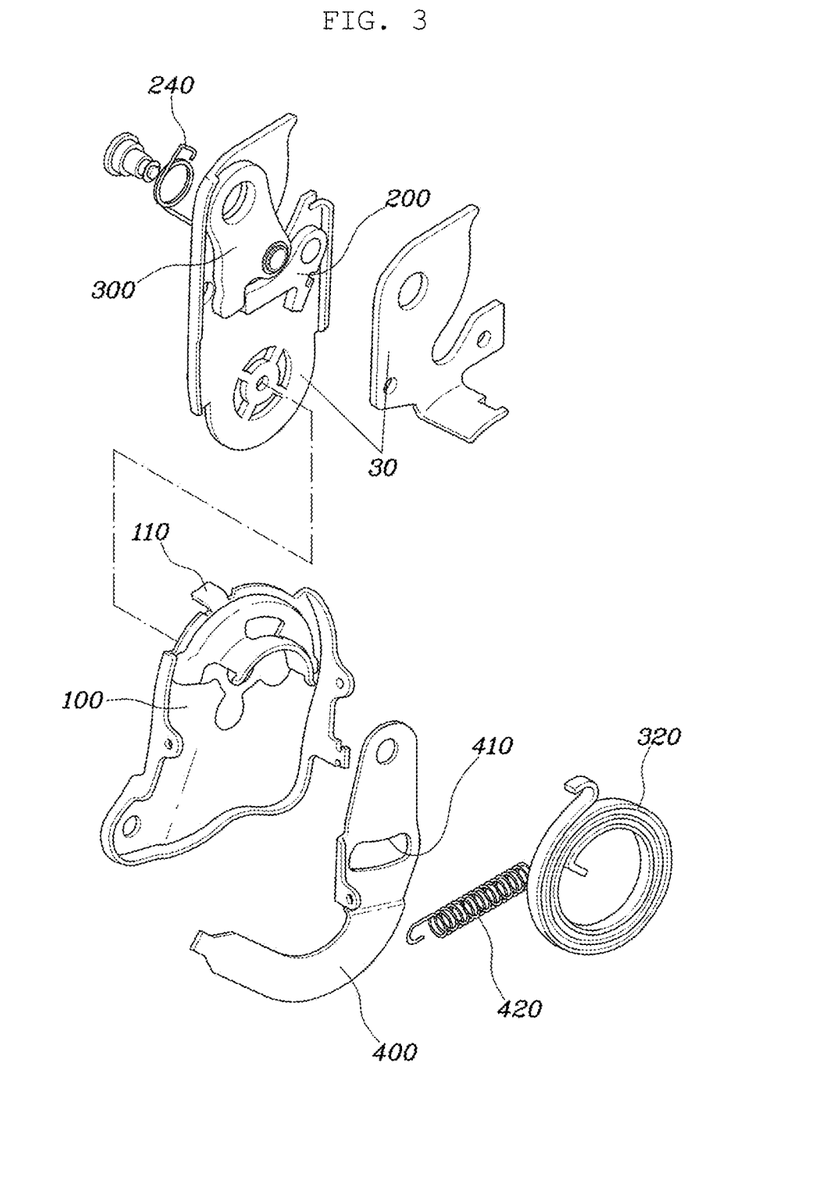
FIG. 3 is an exploded perspective view showing components of a device for folding the seat according to one exemplary embodiment of the present disclosure.
Figure 4:
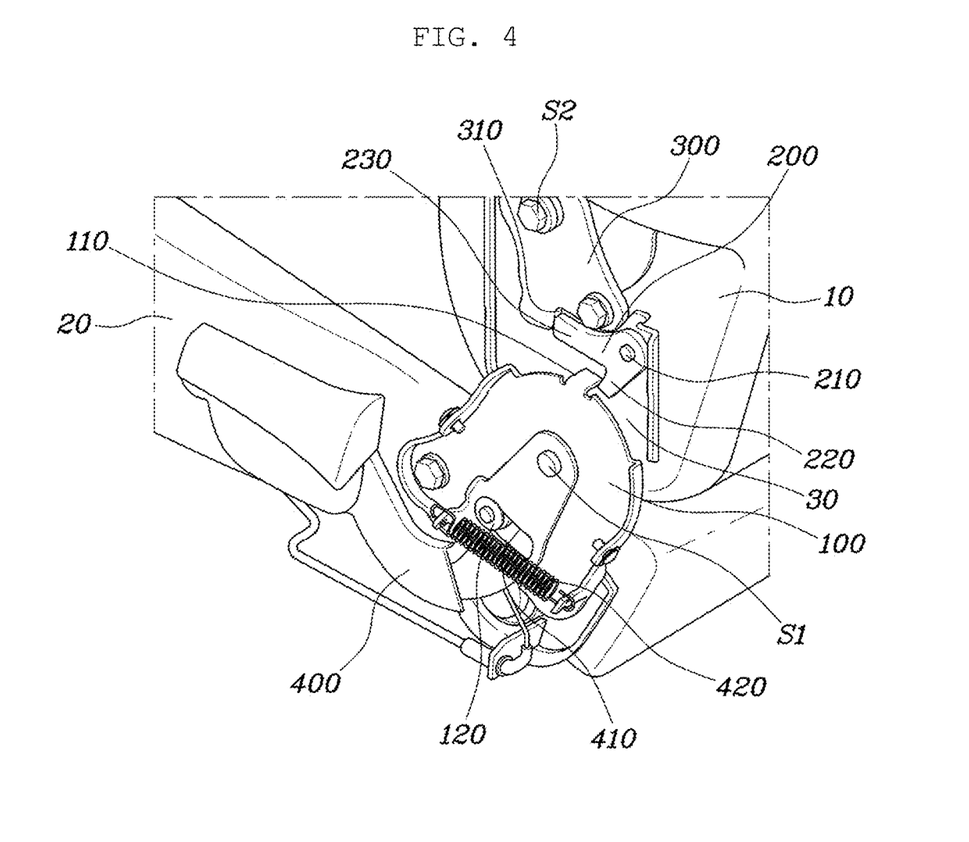
FIG. 4 is a view showing a state prior to a lever manipulation according to one exemplary embodiment of the present disclosure.

FIG. 2 is a view showing a folding behavior of folding a seat according to one exemplary embodiment of the present disclosure, FIG. 3 is an exploded perspective view showing components of a device for folding the seat according to one exemplary embodiment of the present disclosure, and FIG. 4 is a view showing a state prior to a lever manipulation according to one exemplary embodiment of the present disclosure.

With reference to the drawings, the device for folding the seat of the present disclosure includes: a lower arm stopper 110 fixed to a predetermined radial position with a reclining hinge shaft S1 of the seatback 10 as a center; a lock plate 200 configured to rotate with a rotation shaft 210 as a center while being hooked to the lower arm stopper 110 in a process of reclining forward together with the seatback 10 with the reclining hinge shaft S1 as the center; and a folding link 300 limited to rotate by being hooked to the lock plate 200 and configured to make folding rotation together with the seatback 10 with a folding hinge shaft S2, as a center, located at a part above the reclining hinge shaft S1, by being released from being hooked to the lock plate 200 according to the rotation of the lock plate 200.

For example, a plate-shaped lower arm 100 is fixed to a rear end side surface of a seat cushion 20, and a reclining hinge shaft S1 is coupled to a middle of the lower arm 100 so that the seatback 10 performs reclining rotation back and forth with the reclining hinge shaft S1 as the center.

In addition, the lower arm stopper 110 protrudes toward the lock plate 200 on a portion of a top surface edge of the lower arm 100.

In addition, the reclining hinge shaft S1 and the folding hinge shaft S2 are coupled to opposite ends of a folding bracket 30, respectively; the folding bracket 30 makes relative rotation with respect to the lower arm stopper 110 with the reclining hinge shaft S1 as the center; the folding link 300 makes relative rotation with respect to the folding bracket 30 with the folding hinge shaft S2 as a center; and the rotation shaft 210 of the lock plate 200 may be coupled to the folding bracket 30.

For example, the folding bracket 30 in a cover-shape is coupled between the rear end side surface of a seat cushion 20 and a lower end side surface of the seatback 10, wherein a lower end of the folding bracket 30 is rotatably coupled to the reclining hinge shaft S1, and the folding hinge shaft S2 is coupled to an upper end of the folding bracket 30.

In addition, the upper end of the folding link 300 is coupled to the folding hinge shaft S2 so that, with the folding hinge shaft S2 as the center, the seatback 10 and the folding link 300 rotate together with the folding bracket 30 or perform folding rotation back and forth with respect to the folding bracket 30.

In addition, the lock plate 200 is disposed between the lower arm 100 and the folding link 300, and the rotation shaft 210 of the lock plate 200 is coupled to the folding bracket 30, whereby the lock plate 200 rotates about the rotation shaft 210 as the center.

In particular, the lock plate 200 is configured to become a structure such that, with the rotation shaft 210 of the lock plate 200 as the center, one end and an opposite end of the lock plate 200 are extendedly formed toward the lower arm stopper 110 and the folding link 300, respectively; and as the one end of the lock plate rotates while being hooked to the lower arm stopper, the opposite end of the lock plate is released from being hooked to the folding link.

To this end, the lower arm stopper 110 is disposed on a path where the one end of the lock plate 200 rotates with the reclining hinge shaft S1 as the center.

In addition, except for a folding state of the seatback 10, the opposite end of the lock plate 200 is maintained in a state of being hooked to the folding link 300. On the other hand, when the lock plate 200 rotates with the rotation shaft 210 as the center so that the opposite end thereof is released from being hooked to the folding link 300, it becomes a state in which the seatback 10 and the folding link 300 may be folded forward with the folding hinge shaft S2 as the center, regardless of the manipulation of the lever 400.

Therefore, not only the folding operation of the seatback 10 is implemented with one manipulation of the lever 400, but also convenience of the folding operation is improved because there is no need to hold the lever 400 until the folding operation is completed. In addition, the lever 400 is not held until folding is completed, so an impact is prevented from being applied to the hand holding the lever 400, thereby preventing the risk of injury to a user.

Figure 5:
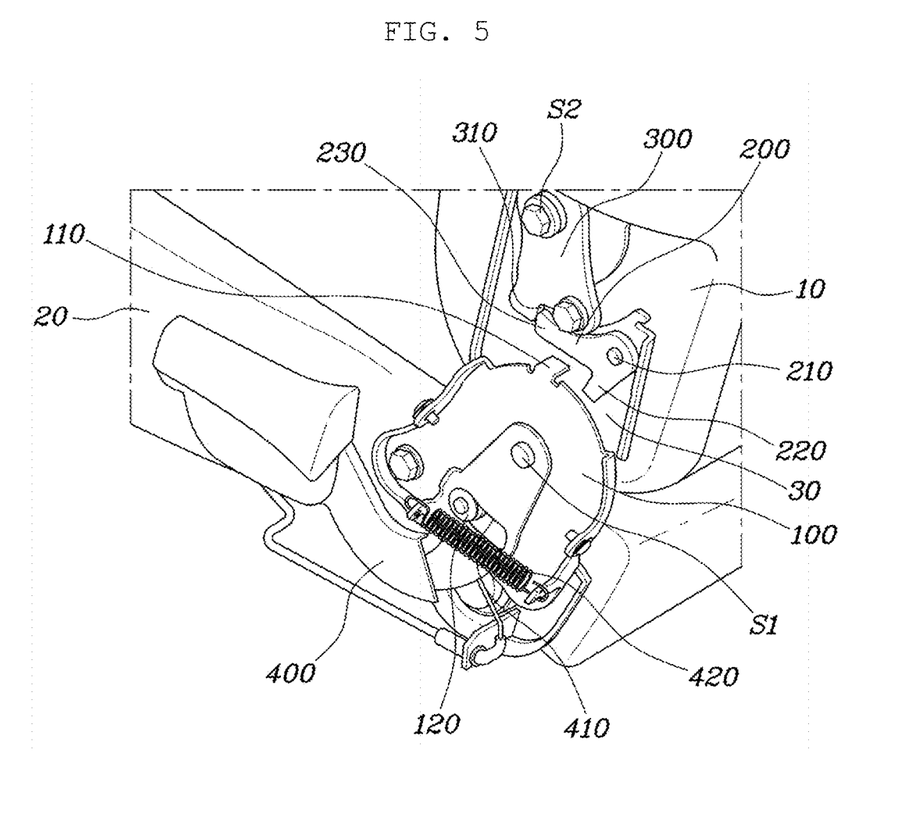
FIG. 5 is a view showing a state before locking of a lock plate by the stopper is released in FIG. 4.

Meanwhile, FIG. 5 is a view showing a state before locking of a lock plate 200 by the lower arm stopper 110 is released in FIG. 4.

When a structure from which the lock plate 200 is to be released is specifically looked at with reference to the drawings, the lock plate 200 has the one end provided with a stopper locking part 220; and the lower arm stopper 110 is disposed on a rotation path of the stopper locking part 220 so that the stopper locking part 220 is pushed by the lower arm stopper 110 to rotate the lock plate 200.

In addition, the folding link 300 is provided with a locking groove part 310 formed at an end thereof; and the lock plate 200 is provided with a link locking part 230 formed at the opposite end thereof; and in a state in which the link locking part 230 is hooked to the locking groove part 310, the link locking part 230 is released from being hooked to the locking groove part 310 according to a rotation of the lock plate 200.

For example, the lock plate 200 is formed in an "L" shape, and the rotation shaft 210 is coupled to a middle portion of the lock plate 200.

In addition, the stopper locking part 220 is formed toward the lower arm stopper 110 at the one end of the lock plate 200, and the stopper locking part 220 is positioned at the rear of the lower arm stopper 110.

In addition, at the opposite end of the lock plate 200, a link locking part 230 is formed toward the locking groove part 310, and the link locking part 230 is hooked to in a form to be inserted into the locking groove part 310.

Therefore, when the seatback 10 rotates forward about the reclining hinge shaft S1 as the center according to the manipulation of the lever 400, the lock plate 200 rotates together with the seatback 10, and the stopper locking part 220 is hooked to the stopper in a rotation process, the lock plate 200 rotates with the rotation shaft 210 as the center.

Accordingly, as the link locking part 230 is released from being hooked to the folding link 300, the seatback 10 rotates forward about the folding hinge shaft S2 as the center to implement the folding operation of the seatback 10.

In addition, the device may further include a plate spring 240 configured to provide an elastic restoring force in a rotational direction to which the lock plate 200 is hooked to the folding link 300.

For example, the plate spring 240 may be a spring having a torsion spring structure, and, in a state of being inserted into the rotation shaft 210 of the lock plate 200, one end is hooked to the folding bracket 30, and an opposite end is hooked to the lock plate 200.

Accordingly, in an unfolding state of the seatback 10, the link locking part 230 is hooked to the locking groove 310 of the folding link 300 to maintain a locking state, and in a process of restoring the seatback 10 from the folding state to the unfolding state, the link locking part 230 is hooked to the locking groove part 310 so that locking is made.

On the other hand, as shown in FIGS. 4 and 5, the present disclosure further includes a lever 400 configured to manipulate a reclining operation or the folding operation of the seatback 10.

In addition, according to the manipulation of the lever 400, locking between the seatback 10 and the seat cushion 20 is released, so that the lock plate 200 and the folding link 300 together with the seatback 10 become a structure that rotates forward with the reclining hinge shaft S1 as the center.

That is, the lock plate 200 rotates about the reclining hinge shaft S1 as the center according to an operation of the lever 400, and by the rotation of the lock plate 200, the folding link 300 is released from being hooked so that the folding link 300 rotates about the folding hinge shaft S2 as the center, whereby the folding operation is performed.

For example, the lever 400 performs rotational manipulation with the reclining hinge shaft S1 as the center, and when the lever 400 performs rotational manipulation, the seatback 10 is released from locking from the seat cushion 2, whereby reclining of the seatback 10 is allowed.

However, the structure in which the locking between the seatback 10 and the seat cushion 20 is released according to the manipulation of the lever 400 is a technique commonly used in the seat field, and the description of the structure and operation thereof will be omitted.

In addition, with the reclining hinge shaft S1 as the center, a guide pin 120 is fixed at a predetermined radial position, and a guide hole 410 of a long hole into which the guide pin 120 is inserted is formed along a rotation path of the lever 400 in the lever 400, thereby allowing the lever 400 to rotate in a section of the guide hole 410.

That is, the guide pin 120 is fixed to the lower arm 100, and the guide hole 410 is formed in a portion of the lever 400 where the guide pin 120 is to be located, so that the lever is manipulated only within the section of the guide hole 410, thereby limiting an excessive manipulation of the lever 400.

In addition, the present disclosure further includes a lever spring 420 configured to provide an elastic restoring force in a rotational direction opposite to an operation direction of the lever 400.

For example, the lever spring 420 may be a spring having a coil spring structure, and one end thereof is hooked to a middle portion of the lever 400, and an opposite end thereof is hooked to a rear edge of the lower arm 100.

Therefore, when the lever 400 is released from a user's hand after the manipulation thereof, the lever 400 may be restored to the position prior to the operation by the elastic restoring force of the lever spring 420.

Figure 6:
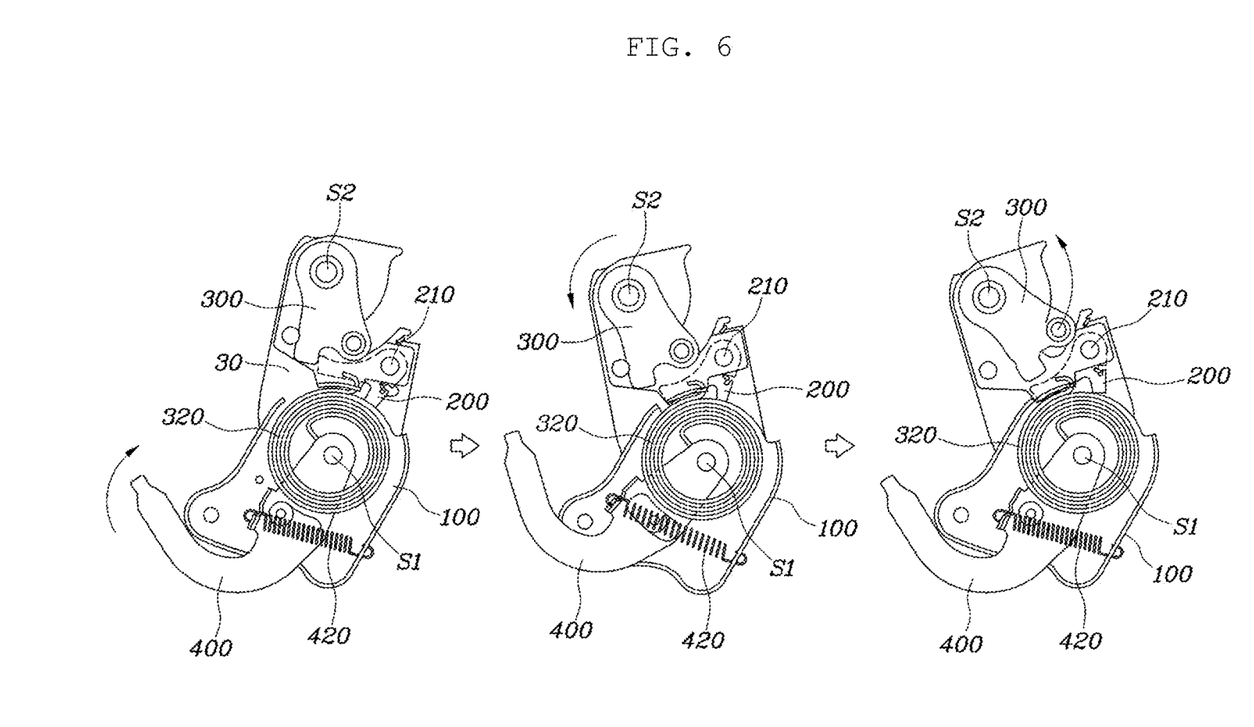
FIG. 6 is a view showing a folding operation reaction of the seat according to one exemplary embodiment of the present disclosure.

Furthermore, as shown in FIGS. 3 and 6, the present disclosure further includes a folding spring 320 configured to provide an elastic restoring force in a folding direction of the seatback 10.

For example, the folding spring 320 may be a spring having a spiral spring structure and is provided in a form of being inserted into the reclining hinge shaft S1, wherein one end of an inner side is hooked to the lower arm 100, and an opposite end of an outer side is hooked to the folding bracket 30.

Accordingly, in a folding process of the seatback 10, the folding spring 320 is configured to provide a force for rotating the seatback 10 forward, thereby assisting the folding operation of the seatback 10.

Hereinafter, the folding process of the seatback 10 according to the present disclosure will be described.

When described with reference to FIG. 6, as the lever 400 is manipulated to be pulled upwardly, a locking state between the seatback 10 and the seat cushion 20 is released.

Accordingly, the seatback 10 rotates forward with the reclining hinge shaft S1 as the center by the elastic restoring force of the folding spring 320, and at this time, the lock plate 200 and the folding link 300 rotate together.

In the rotation process, the stopper locking part 220 of one end of the lock plate 200 is hooked to the lower arm stopper 110, and the lock plate 200 rotates counterclockwise based on the state shown in the drawing with the rotation shaft 210 as the center.

At this time, the link locking part 230 of the opposite end of the lock plate 200 is hooked to the locking groove 310 of the folding link 300 so that the folding link 300 is in a state of maintaining a locking state by the lock plate 200.

In such a state, according to the counterclockwise rotation of the lock plate 200, the link locking part 230 hooked to the locking groove part 310 is separated from the locking groove part 310, whereby the locking state of the folding link 300 is released.

Accordingly, the seatback 10 together with the folding link 300 rotates forward about the folding hinge shaft S2 as the center.

Accordingly, according to a forward rotation of the seatback 10, the folding operation of the seatback 10 is implemented as shown in a bottom view of FIG. 2.

In particular, in the folding process of the seatback 10, the lock plate 200 rotates forward about the reclining hinge shaft S1 as the center so that the link locking part 230 is separated from the locking groove part 310. In addition, in such a state, since the folding link 300 further rotates forward together with the seatback 10, even when the lever 400 is restored to the position prior to the manipulation by releasing the user's hand from the lever 400, the lock plate 200 becomes not to be hooked to the folding link 300 in the folding process.

Accordingly, the present disclosure not only implements a folding operation of the seatback 10 with one manipulation of the lever 400, but also improves convenience of the folding operation because there is no need to hold the lever 400 until the folding operation is completed.

Moreover, since it is not necessary to hold the lever 400 until folding is completed, an impact is prevented from being applied to the hand holding the lever 400, thereby preventing the risk of injury to the user during the folding operation of the seatback 10.

On the other hand, although the present disclosure has been described in detail only with respect to the above specific examples, it is obvious to those skilled in the art that various modifications and variations are possible within the scope of the technical spirit of the present disclosure, and it is natural that such variations and modifications belong to the appended claims.

What is claimed is:

1. A device for folding a seat, the device comprising:
 a lower arm stopper formed on a predetermined radial position of a lower arm with respect to a reclining hinge shaft of a seatback as a center;
 a lock plate configured to rotate about a rotation shaft as a center while being hooked to the lower arm stopper in a process of reclining forward together with the seatback with respect to the reclining hinge shaft as the center;
 a folding link configured to be limited to rotate by being hooked to the lock plate and configured to make folding rotation together with the seatback with respect to a folding hinge shaft, as a center, located at a part above the reclining hinge shaft, by being released from being hooked to the lock plate according to the rotation of the lock plate; and
 a lever configured to manipulate a reclining or folding operation of the seatback,
 wherein according to a manipulation of the lever, locking between the seatback and the seat cushion is released so that the lock plate and the folding link together with the seatback rotate forward about the reclining hinge shaft as the center,
 with the reclining hinge shaft as the center, a guide pin is fixed at another predetermined radial position of the lower arm, and
 a guide hole of a long hole into which the guide pin is inserted extends along a rotation path of the lever in the lever, thereby allowing the lever to rotate in a guide hole section.

2. The device of claim 1, wherein the reclining hinge shaft and the folding hinge shaft are coupled to opposite ends of a folding bracket, respectively;
 the folding bracket is configured to make rotation relative to the lower arm stopper with respect to the reclining hinge shaft as the center;
 the folding link is configured to make rotation relative to the folding bracket with respect to the folding hinge shaft as the center; and
 the rotation shaft of the lock plate is coupled to the folding bracket.

3. The device of claim 1, wherein, with the rotation shaft of the lock plate as a center, one end and an opposite end of the lock plate extend toward the lower arm stopper and the folding link, respectively; and
 as the one end of the lock plate rotates while being hooked to the lower arm stopper, the opposite end of the lock plate is released from being hooked to the folding link.

4. The device of claim 3, wherein the one end of the lock plate is provided with a stopper locking part; and
 the lower arm stopper is disposed on a rotation path of the stopper locking part so that the stopper locking part is pushed by the lower arm stopper to rotate the lock plate.

5. The device of claim 3, wherein an end of the folding link is provided with a locking groove part;
 the opposite end of the lock plate is provided with a link locking part; and
 in a state in which the link locking part is hooked to the locking groove part, the link locking part is released from being hooked to the locking groove part according to the rotation of the lock plate.

6. The device of claim 1, further comprising a plate spring configured to provide an elastic restoring force in a rotational direction to which the lock plate is hooked to the folding link.

7. The device of claim 1, further comprising a lever spring configured to provide an elastic restoring force in a rotational direction opposite to an operation direction of the lever.

8. The device of claim 1, wherein the lock plate rotates about the reclining hinge shaft as the center according to an operation of the lever; and
   by the lock plate, the folding link is released from being hooked so that the folding link rotates with the folding hinge shaft as the center, whereby the folding operation is performed.

9. The device of claim 1, further comprising a folding spring configured to provide an elastic restoring force in a folding direction of the seatback.

\* \* \* \* \*